United States Patent [19]
Shires

[11] 3,863,018
[45] Jan. 28, 1975

[54] METHOD OF PRODUCING AN EGG PRODUCT
[75] Inventor: Frank Shires, Chalfont St. Giles, England
[73] Assignee: Dell Foods Limited, Chalfont St. Giles, Buckinghamshire, England
[22] Filed: Oct. 23, 1973
[21] Appl. No.: 408,576

Related U.S. Application Data
[63] Continuation-in-part of Ser. No. 178,450, Sept. 7, 1971, abandoned.

[30] Foreign Application Priority Data
July 31, 1970 Great Britain.................... 37149/70

[52] U.S. Cl................. 426/388, 426/106, 426/148, 426/211, 426/407, 426/412, 426/517
[51] Int. Cl................................................ A23l 1/32

[58] Field of Search ........... 426/211, 298, 348, 388, 426/413, 515

[56] References Cited
UNITED STATES PATENTS
3,493,393    2/1970    Shires ................................ 426/393

Primary Examiner—Raymond N. Jones
Assistant Examiner—R. A. Yoncoskie

[57] ABSTRACT

A method for producing an egg product comprising filling an elongated container with egg white and a stick of solidified frozen egg yolk and solidifying the egg white while the container is supported in a substantially vertical position and is agitated to substantially center the stick of yolk in the container and surround the yolk laterally with egg white.

5 Claims, No Drawings

METHOD OF PRODUCING AN EGG PRODUCT

This application is a continuation-in-part of application Ser. No. 178,450, filed Sept. 7, 1971 and now abandoned, and relates to a method for the production of an egg product.

In U.S. Pat. No. 3,493,393 there is described and claimed a method for the production of an egg product of the kind disclosed in U.S. Pat. No. 3,285,749.

In such method an elongated container having egg white and a pre-formed stick of egg yolk therein is rotated horizontally about its major axis. The egg white is solidified by heating the rotating container or by rotating the container in a freezing medium until the egg white is solidified. When the egg white is solidified, the stick of egg yolk lies substantially along the major axis of the elongated container.

In the method of the instant invention, the egg yolk is centered in the container by a much simpler motion of the container during the solidification or setting of the egg white. Supporting of the container is simplified and more uniform results are attained.

According to the invention, a method for the production of an egg product comprises disposing egg white and an elongated body or stick of solidified egg yolk which has been frozen until rigid so that it will not bend or break, for example an extruded and frozen stick of crystallized or coagulated egg yolk, in an elongated container whereby the container is substantially full when sealed. The egg white is thereafter solidified, for example by heating or freezing, while the container is supported in a vertical position and shaken to a degree sufficient to keep the liquid egg white moving while it is being cooked or frozen.

The amount of shaking to be imparted to the container so as to move the stick of egg yolk away from the wall and towards the vertical center of the container is relatively small. This is because in the instant invention it has been discovered that, when the filled container is placed in vertical position, the upper end of the yolk stick tends to center itself in the container at the upper vertical end of the container. Thus, with a relatively small amount of shaking, the balance of the rigid frozen yolk stick can be centered or substantially centered in the container.

The direction of shaking of the vertical container is preferably such that the movement imparted to the container has a component at right angles to the major axis of the container, that is to say, the movement imparted to the container is preferably at an angle to the major axis of the container. Advantageously, the direction of shaking is at right angles to the major axis of the container at the vertical bottom of the container.

Such shaking during the solidification of the egg white, for example while the egg white is being cooked, is sufficient to insure that the stick of egg yolk will be surrounded laterally by egg white in the finished egg product.

It will be understood that, if desired, the vertically supported container may be simultaneously rotated about its main axis during the shaking.

The container when filled with the stick of egg yolk and egg white, is preferably circular in cross-section. The stick of egg yolk is also preferably substantially circular in cross-section. The container is suitably a cylindrical casing of a flexible synthetic polymeric material, such as polyethylene or other polyolefin, or it may be a rigid tube of stainless steel which has been treated internally with a non-stick or release agent. The container may, however, be made of another metal or material provided that it is inert to the egg product. The length and diamter of the container may be varied as desired. The internal diameter of the container is suitably from 1 ⅜ to 1 ⅞ inches, for example 1 ⅝ inches.

The stick of egg yolk may be produced by feeding yolks which have been cooked in their skins into a worm or screw extruder from which the egg yolks are extruded through a nozzle as an integral stick, preferably a cylindrical stick. The extruded stick of egg yolk, or a portion of it, is then frozen until rigid and is then disposed in the container. The cross section of the container is larger than the cross section of the egg yolk stick and the remainder of the space in the container is filled with egg white. The ends or open end of the container are then sealed in any convenient manner, for example by means of a readily removable clip or a length of twine. The egg white may be introduced into the container before, simultaneously with, or after the stick of egg yolk. The container is then positioned so that the major axis of the container is vertical or substantially vertical. Heat is applied to coagulate or solidify the egg white, for example by immersing the container in hot or boiling water, during which time the container is slightly shaken. Such shaking may consist in moving the lower or bottom vertical end of the container to and fro in a direction at right angles to the main or longitudinal axis of the container. As the egg white thickens, the rigid egg yolk stick is automatically forced away from the wall and towards the longitudinal axis of the container so that when the white has finally set, the yolk is surrounded laterally by egg white. The main axis of the stick of egg yolk is substantially along the main axis of the container.

The vertically positioned container may be shaken by oscillating the lower vertical end of the container. The extent of the oscillation, that is the amplitude or distance between the two extreme positions of the oscillation, and the speed of oscillation must be sufficient to keep the egg white in motion during progressive coagulation until the egg white is solidified. If the container is oscillated or rocked manually, the amplitude of the oscillation may, for example, be 2 inches, but if the oscillation is effected mechanically and at a greater speed the amplitude of the oscillation may, for example, be ¼ inch.

The duration of the shaking depends on the diameter of the egg product being cooked or otherwise coagulated. The shaking period need only generally be about half the cooking time as by then the egg white will usually have thickened to a degree that it can no longer be moved in the container by shaking. Thus, if the cooking time is 8 minutes, then the shaking need generally only be effected during the initial 4 minutes or so of that 8 minute period.

Instead of shaking the container in boiling or near-boiling water to solidify the egg white, the solidification of the egg white can be effected with the container in a freezing cabinet or tunnel. The vertical container is shaken in the cabinet or tunnel and as the egg white thickens and freezes, the rigid stick of egg yolk is forced towards the center of the container. The egg product may then be kept in deep-freeze until required for use, at which stage it is placed in hot or boiling water until the white of egg is defrosted and cooked.

For shaking, the container or containers may be hung or be otherwise supported in vertical or substantially vertical position in a holding frame and be placed in boiling or near boiling water or a freezer and then shaken or oscillated. The oscillation may be effected manually or mechanically, for example, through a rocker arm or vibrator. Alternatively and/or additionally, if the coagulation is being effected by cooking in water, the body of water may also be oscillated.

The egg product produced according to the invention is particularly adapted to be cut into sections for use in salads, sandwiches, meat pies, egg pies and the like.

The invention is illustrated in the following example:

EXAMPLE

A coagulated frozen and rigid stick of egg yolk was placed in a flexible tubular casing closed at one end, after which liquid egg white was introduced into the casing. The ratio of egg white to egg yolk in the casing was substantially that of the average egg. The open end was then sealed with the casing full, the diameter of the casing being substantially 1 ⅝ inches.

The filled casing or container was then placed with its longitudinal or major axis vertical in a body of near boiling water, the casing being supported on a sliding frame. The frame was then oscillated through a distance of approximately 2 inches in a direction at right angles to the longitudinal axis of the casing, so similarly oscillating the casing in the body of water. The oscillation was effected manually.

After approximately 4 minutes, the oscillation was discontinued as the egg white had then thickened to a degree that it was no longer moved by the oscillation. The casing was held in the near boiling water for a further 4 minutes, that is for a total period of 8 minutes, to complete the cooking. The stick of solidified egg yolk was covered laterally throughout the whole of its length with solidified egg white.

What is claimed is:

1. A method for producing an egg product in an elongated container in which an elongated stick of solidified egg yolk is laterally surrounded by egg white, the steps comprising disposing a pre-formed elongated stick of solidified frozen egg yolk in an elongated container having a cross-section larger than the cross-section of said egg yolk stick, substantially filling the remaining volume of said container with liquid egg white, with the ends of said container sealed, supporting said sealed container with said solidified yolk stick and liquid egg white therein so that the major axis of said elongated container extends substantially vertically, rocking the lower end of said container through an arc not substantially longer than 2 inches and substantially centering said egg yolk stick in said container and, with said egg yolk substantially centered in said container, solidifying said egg white in said container.

2. In a method, as recited in claim 1, in which said egg white is solidified by cooking said egg white in said vertically positioned container.

3. In a method, as recited in claim 1, in which said egg white is solidified by freezing said egg white in said vertically positioned container.

4. In a method, as recited in claim 1, in which said container is supported at its vertical upper end.

5. In a method, as recited in claim 4, in which said egg white is solidified by cooking said egg white in said vertically positioned container while said container is being rocked through said arc, said rocking being continued for the first half of the cooking time.

* * * * *